(12) United States Patent
Ash et al.

(10) Patent No.: US 9,857,657 B2
(45) Date of Patent: Jan. 2, 2018

(54) ELECTROCHROMIC WHITEBOARD PRIVACY WINDOW OR DIVIDER

(71) Applicant: Gentex Corporation, Zeeland, MI (US)

(72) Inventors: Kevin L. Ash, Grand Rapids, MI (US); Steven J. Veenman, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 23 days.

(21) Appl. No.: 15/177,996

(22) Filed: Jun. 9, 2016

(65) Prior Publication Data

US 2016/0363831 A1    Dec. 15, 2016

Related U.S. Application Data (60) Provisional application No. 62/174,563, filed on Jun. 12, 2015.

(51) Int. Cl.

| | | |
|---|---|---|
| *G02F 1/133* | (2006.01) | |
| *G02F 1/1333* | (2006.01) | |
| *G02F 1/153* | (2006.01) | |
| *G02F 1/157* | (2006.01) | |
| *E06B 9/24* | (2006.01) | |
| *G09G 3/38* | (2006.01) | |
| *G09G 3/34* | (2006.01) | |
| *F21V 14/00* | (2006.01) | |
| *B64C 1/14* | (2006.01) | |

(52) U.S. Cl.
CPC .............. *G02F 1/157* (2013.01); *E06B 9/24* (2013.01); *G02F 1/13318* (2013.01);
(Continued)

(58) Field of Classification Search
CPC ........... G02F 1/133308; G02F 1/13318; G02F 1/13338; G02F 1/133605; G02F 1/1335; G02F 1/153; G02F 1/1533; G02F 1/157; G02F 1/29; G02F 2001/133331; E06B 9/24; E06B 2009/2464; G09G 3/3406; G09G 3/34; G09G 3/38; F21V 11/00; F21V 11/02; F21V 14/003; B64C 1/1484; B64C 1/1492
USPC ....... 359/245, 265, 267, 275, 315, 318, 599; 345/49, 105; 349/61, 64, 65; 362/23.09, 362/253, 471, 600, 613
See application file for complete search history.

(56) References Cited

U.S. PATENT DOCUMENTS 5,659,423 A * 8/1997 Schierbeek ........... B60R 1/0602
                                                               359/602
7,859,738 B2 * 12/2010 Baur ................ B32B 17/10174
                                                               359/265

(Continued)

*Primary Examiner* — Loha Ben
(74) *Attorney, Agent, or Firm* — Price Heneveld LLP; Bradley D. Johnson (57) ABSTRACT

A partition assembly includes a rigid support frame and a first transparent pane in abutting contact with an inner surface of the frame. The first transparent pane includes an interior surface and an exterior surface. The assembly further includes an electro-optic element received within the frame and positioned adjacent the interior surface of the first transparent pane. The electro-optic element operates between a transmissive condition and a dimmed condition with a surface of the electro-optic element exhibiting a first level of spectral reflectivity at least when in the dimmed condition. A cover assembly is received within the frame and is positioned opposite the electro-optic element from the first transparent pane. The cover assembly includes a light transmitting sheet and a plurality of light sources disposed at edges of the light transmitting sheet.

20 Claims, 7 Drawing Sheets

(52) U.S. Cl.
CPC .... *G02F 1/13338* (2013.01); *G02F 1/133308* (2013.01); *G02F 1/1533* (2013.01); *G09G 3/38* (2013.01); *B64C 1/1492* (2013.01); *E06B 2009/2464* (2013.01); *F21V 14/003* (2013.01); *G02F 2001/133331* (2013.01); *G09G 3/3406* (2013.01)

(56) References Cited

U.S. PATENT DOCUMENTS

| | | | | |
|---|---|---|---|---|
| 8,179,236 B2* | 5/2012 | Weller | ............ | B60R 1/12 340/425.5 |
| 8,254,011 B2* | 8/2012 | Baur | ............ | B32B 17/10174 359/265 |
| 8,503,062 B2* | 8/2013 | Baur | ............ | B32B 17/10174 359/265 |
| 8,559,092 B2* | 10/2013 | Bugno | ............ | B60R 1/088 359/265 |
| 8,654,433 B2* | 2/2014 | Baur | ............ | B32B 17/10174 359/265 |
| 8,837,032 B2* | 9/2014 | Lam | ............ | G02B 5/23 359/241 |
| 9,176,357 B2* | 11/2015 | Lam | ............ | B60J 3/04 |
| 2015/0227003 A1* | 8/2015 | Ninan | ............ | G09G 3/3426 359/237 |
| 2015/0354790 A1* | 12/2015 | Ash | ............ | B64C 1/1492 362/471 |

* cited by examiner

ELECTROCHROMIC WHITEBOARD PRIVACY WINDOW OR DIVIDER

CROSS-REFERENCE TO RELATED APPLICATION

This application claims priority under 35 U.S.C. §119(e) to U.S. Provisional Patent Application No. 62/174,563, filed on Jun. 12, 2015, entitled "ELECTROCHROMIC WHITEBOARD PRIVACY WINDOW OR DIVIDER," the disclosure of which is hereby incorporated herein by reference in its entirety.

TECHNOLOGICAL FIELD

The present disclosure relates generally to a partition assembly including an electro-optic element. More particularly, the partition assembly includes a cover assembly emitting a diffuse light and overlying the electro-optic element.

SUMMARY

According to an aspect of the disclosure, a partition assembly including a rigid support frame and a first transparent pane in abutting contact with an inner surface of the frame. The first transparent pane includes an interior surface and an exterior surface. The assembly further includes an electro-optic element received within the frame and positioned adjacent the interior surface of the first transparent pane. The electro-optic element operates between a transmissive condition and a dimmed condition with a surface of the electro-optic element exhibiting a first level of spectral reflectivity at least when in the dimmed condition. A cover assembly is received within the frame and is positioned opposite the electro-optic element from the first transparent pane. The cover assembly includes a light transmitting sheet and a plurality of light sources disposed at edges of the light transmitting sheet to emit light into the light transmitting sheet to illuminate the light transmitting sheet with a diffuse light.

According to another aspect of the disclosure, a partition assembly includes an electro-optic element operating between a transmissive condition and a dimmed condition and a cover assembly proximate the electro-optic element. The cover includes a light transmitting sheet and a plurality of light sources disposed at edges of the light transmitting sheet to emit light into the light transmitting sheet to illuminate the light transmitting sheet according to one of: a predetermined color, a predetermined intensity, and a combined predetermined color and intensity. The assembly further includes a control system coupled with the light sources of the dust cover assembly to control the illumination of the light transmitting sheet. A rectangular frame supports the electro-optic element and the cover assembly therein in a generally parallel and spaced apart manner.

According to another aspect of the disclosure, a partition assembly includes an electro-optic element operating between a transmissive condition and a dimmed condition and a cover assembly proximate the electro-optic element. The cover assembly includes a light transmitting sheet and a plurality of light sources disposed at edges of the light transmitting sheet to emit light into the light transmitting sheet to illuminate the light transmitting sheet. A rectangular frame supports the electro-optic element and the cover assembly therein in a generally parallel and spaced apart manner. A first edge of the rectangular frame defines an interface. A support element includes at least a component of one of a portable divider, a window unit, or a cubicle wall is coupled with the rectangular frame at the interface thereof.

These and other features, advantages, and objects of the present device will be further understood and appreciated by those skilled in the art upon studying the following specification, claims, and appended drawings.

DETAILED DESCRIPTION OF EMBODIMENTS

Figure 1:
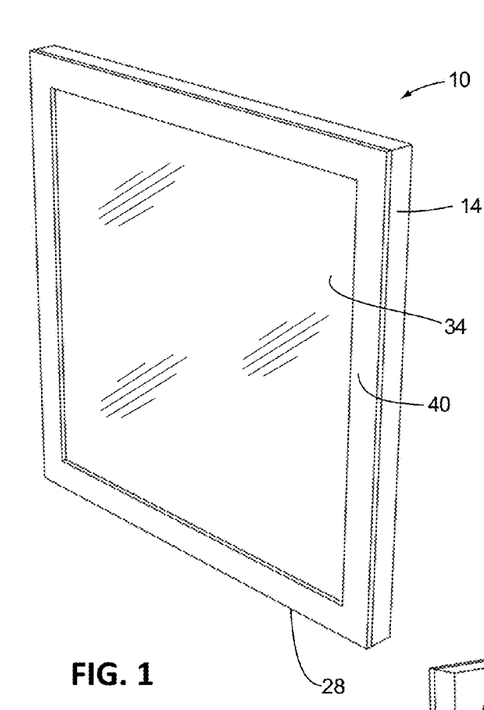
FIG. 1 is a front perspective view of a partition assembly.
Figure 2:
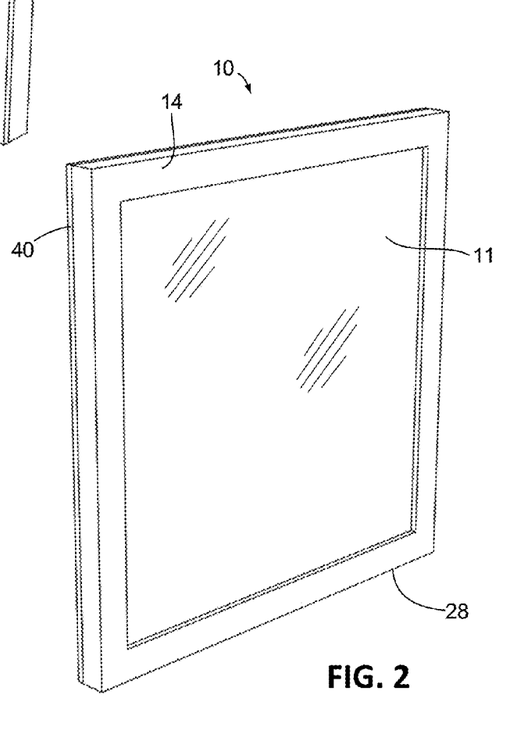
FIG. 2 is a back perspective view of the partition assembly of FIG. 1.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4, reference numeral 10 generally designates a partition assembly having a first transparent pane 11 received adjacent an inner surface 12 of a frame 14. The pane 11 includes an interior surface 16 and an exterior surface 18. An electro-optic element 20 (FIG. 3) is also disposed within frame 14. The electro-optic element 20 is capable of operation between a transmissive condition and a dimmed condition, along with various intermediate conditions therebetween. A cover assembly 22 (FIG. 4) is disposed within frame 14. The cover assembly 22 includes a plurality of light sources 24 (FIG. 5) disposed at edges of a light transmitting sheet 26 (shown in FIGS. 3, 4, and 5). The light sources 24 are configured to transmit light into the sheet 26 to illuminate the sheet 26 in a particular color and with a particular intensity.

With reference to FIGS. 1-4, the frame 14 can be generally designed to support pane 11, electro-optic element 20, and cover assembly 22 and to facilitate use of partition assembly 10 as a portion of various barriers commonly used in an office or workplace setting. Additionally, the partition assembly 10, as disclosed herein can be adapted for use as or incorporation into a dust-cover assembly for aerospace applications. In particular, an edge lit cover of the type described in co-pending, commonly-assigned U.S. Provisional Patent Application Nos. 62/008,144 and 62/032,010, the entire disclosures of which are hereby incorporated herein by reference in their entirety, may incorporate usability as a whiteboard, as described further herein by the addition or incorporation of the features and structures described herein. In the example shown in FIGS. 6-8, partition assembly 10 is shown as a portion of a larger divider assembly 30 in which a support base 32 is coupled with a portion of frame 14. As discussed further below, the use of electro-optic element 20 and cover assembly 22 in connection with such a divider assembly 30 may allow for use thereof defining various work areas (e.g., meeting areas, individual work areas) within a larger general area in portable, free-standing manner. In other examples, frame 14 can be adapted for assembly in a portion of a cubicle wall, either as an insert in a larger wall or as an individually-assembled unit in a multi-level or "tile"-based cubicle system. In a still further example, frame 14 can be adapted for assembly in place of an ordinary interior window or as a window within a modular office wall system. Accordingly, the particular dimensions and structure of frame 14 can vary so as to be suitable for such varying uses, including by incorporating or mimicking various coupling structures used in existing variations of system elements or components that partition assembly 10 can replace or couple with. Similarly, the dimensions of pane 11, electro-optic element 20 and light transmitting sheet 26 can vary, as desired, to fit within a variation of frame 14 according to such adaptations.

The electro-optic element 20 of the present disclosure may make use of or incorporate various structures or compositions such as those described in U.S. Pat. Nos. 8,925,891; 8,814,373; 8,201,800; and 8,210,695; U.S. Patent Application Publication Nos. 2014/0063630 and 2012/0327234; and U.S. Provisional Patent Application Nos. 61/709,716; 61/707,676; and 61/704,869, which are hereby incorporated herein by reference in their entirety.

Figure 3:
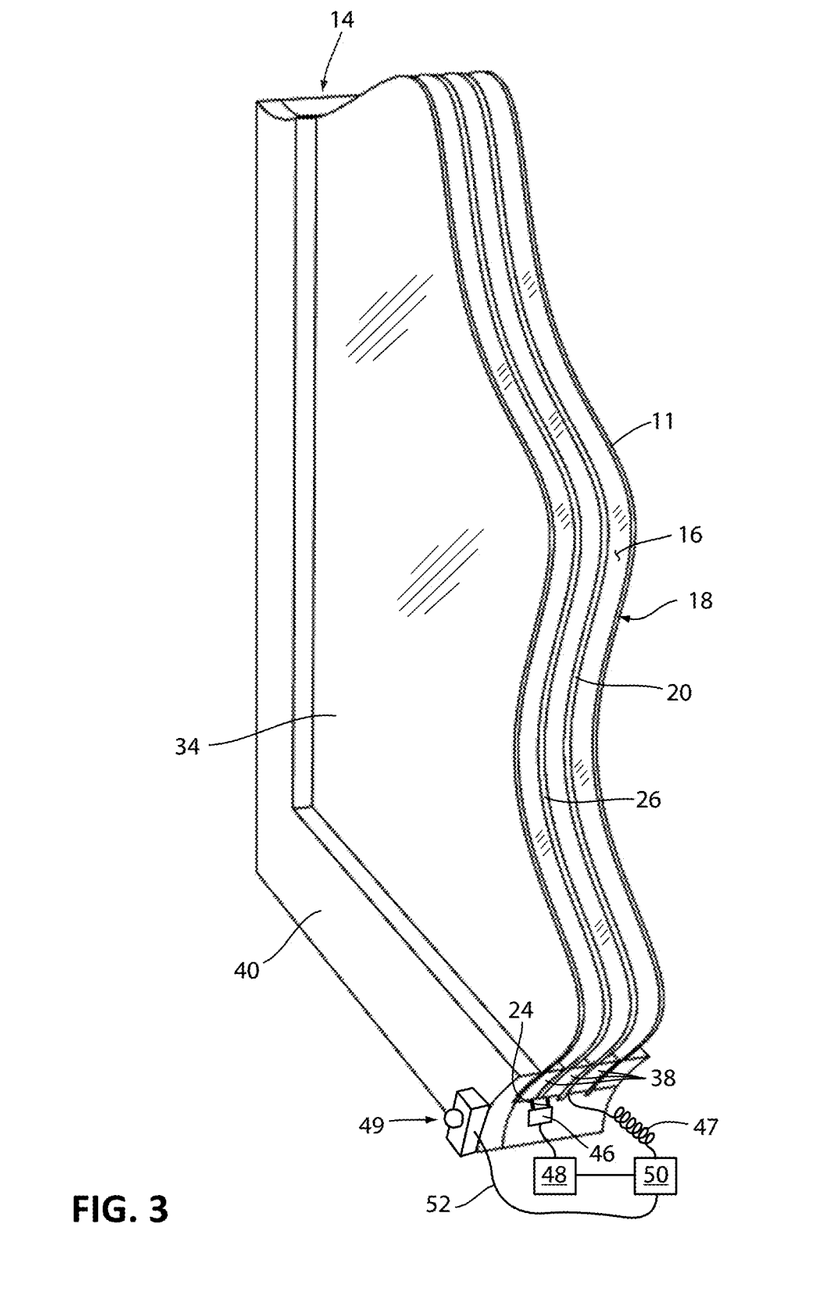
FIG. 3 is a section view of the partition assembly of FIG. 1, shown schematically with additional components useable in connection therewith.
Figure 4:
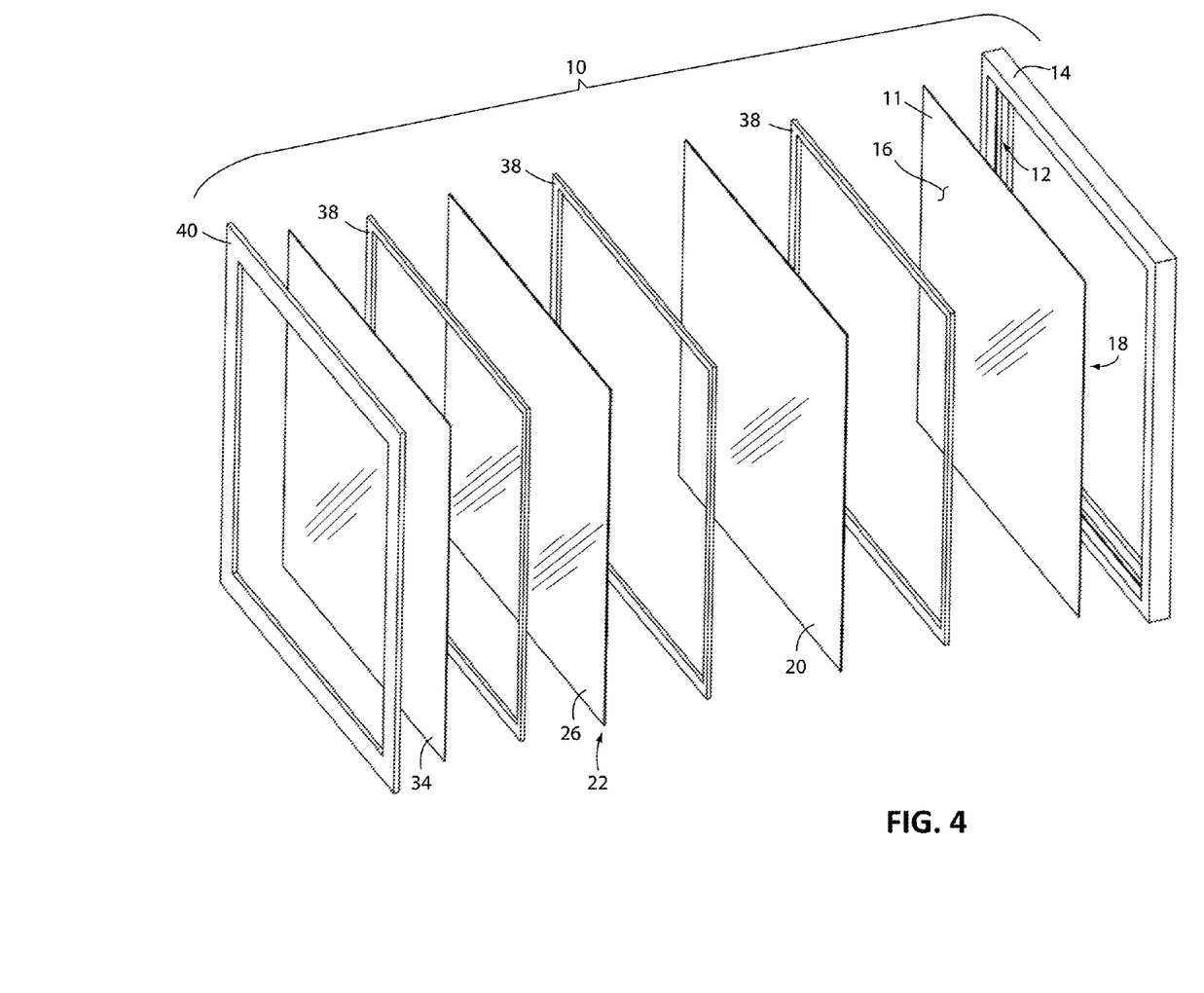
FIG. 4 is an exploded view of the partition assembly of FIG. 1.

As shown in FIGS. 3 and 4, partition assembly 10 may further include a second transparent pane 34 opposite electro-optic element 20 and cover assembly 22 from first pane 11. Second pane 34, as well as first pane 11 may be of glass, which may include various additives or coatings. Further, second pane 34 may provide an outer protective layer for light transmitting sheet 26 and may facilitate additional usage modes for partition assembly 10, such as the use thereof as a whiteboard in a particular setting and/or configuration thereof, discussed further below. As further shown in FIGS. 3 and 4, a plurality of inserts 38 may fit within interior 12 of frame 14 to maintain separation between, for example, electro-optic element 20 and first pane 11, or between electro-optic element 20 and light transmitting sheet 26. Inserts 38 or similar structures may help to retain electro-optic element 20 and light transmitting sheet 26 in desired positions within frame 14 and may, further, accommodate or help secure light sources 24 adjacent light transmitting sheet 26. In an example, a flexible bezel, which may be of foam in an example, may fit within frame 14 and may include one or more channels to receive electro-optic element 20, cover assembly 22 and/or second pane 34. In FIGS. 3 and 4 an insert 38 is shown positioned between light transmitting sheet 26 and second pane 34. In a variation, however, second pane 34 can directly overlie light transmitting sheet 26 in contact therewith. In a further variation, light transmitting sheet 26 can itself directly overlie electro-optic element 20 in contact therewith. For example, electro-optic element, light transmitting sheet 26, and second pane 34 can be bonded or otherwise assembled together and assembled within frame 14 in a single unit. An outer bezel 40 can couple with frame 14 to secure the above-described structures, or various combinations thereof, in partition assembly 10.

With reference again to FIGS. 3 and 4, cover assembly 22 is operably coupled with a user control interface ("UCI") (not shown) that can control the light sources 24 adjacent the edges of the cover assembly 22 by connection thereof with printed circuit board ("PCB") 46, which controls the operation of light sources 24. The UCI is operably coupled with an electronic control unit or controller 48. The electronic controller 48 is also operably coupled with the electro-optic element 20 via an electro-optic element pigtail 47. A power and communications interface ("PCI") 50 is linked, via communication line 52, to the electronic control unit 48 and supplies both power and activation information to the UCI and the electro-optic element 20. The PCI 50 may provide a control link for multiple partition assemblies 10 to be controlled by a single interface (e.g. a remote control or by a UI on a smartphone or computer). The PCI 50 can also be optionally connected with a photosensor 49 positioned within the vicinity of partition assembly 10, such as along a portion of frame 14. Photosensor 49 can be connected via line 52 to PCI 50 such that information from photosensor 49 can be used by PCI 50, or a computer connected therewith, in determining power and activation information provided to the UCI 46 according to control schemes discussed further below.

With reference to the embodiment illustrated in FIGS. 1-4, the cover assembly 22 is constructed from a plastic, light transmitting sheet 26 configured to be edge-lit by the light sources 24, such as light emitting diodes ("LEDs"), organic light emitting diodes ("OLEDs"), or the like, to produce a desired predetermined color, which can be done, for example, when the electro-optic element 20 is in a darkened state, as well as in an un-darkened state, or various states between un-darkened and fully-darkened. The light sources 24 may be stacked along an edge of the cover assembly 22, or may be spaced at predetermined intervals. Additionally, the light sources 24 may be positioned on one or more sides of the cover assembly 22, or even around the entire perimeter of the cover assembly 22. Additionally, edge reflectors can be utilized to direct light from the light sources (e.g., LEDs) back into the light transmissive sheet 26. The light sources 24 are configured to emit light into the edge of the cover assembly 22, such that light is directed throughout the cover assembly 22, and also projects inwardly in the direction of arrows 54 outwardly into the area surrounding assembly 10 and also inwardly toward the electro-optic element 20.

In one embodiment, the light sources 24 can be used in connection with electro-optic element 20 to give the appearance of a generally opaque, diffuse surface. In at least some respects, such an appearance can generally match that of other features surrounding partition assembly 10, such as an adjacent interior wall, cubicle wall, or the like, which itself may have a non-reflective or diffusely reflective surface. Indeed, the edge lit cover assembly 22 is not necessarily opaque, but the light that emanates from the cover assembly 22 can work to overpower any appearance of a reflection in the electro-optic element 20, which can be made opaque (or can otherwise be set to a particular level of opacity). This feature can be used to counteract any "black mirror" effect that the electro-optic element 20 may exhibit in an opaque or near-opaque state, for example. More specifically, the surfaces of electro-optic element 20 may have specular reflective qualities that tend to reflect an image, rather than diffusely reflecting light. As such, as the light transmissivity of an electro-optic element 20 is reduced, a greater percentage of light reflected by the surface thereof is perceptible to a viewer, as there is less transmitted light to overcome such reflections. Since the light is reflected in a specular manner, an image becomes apparent in the form of a mirror image of the surroundings of electro-optic element 20. Some occupants of a work environment in which cover assembly 22 is installed may find such specular reflectiveness irritating, distracting, or otherwise unacceptable.

By contrast, when cover assembly 22 is illuminated, it emanates light in a diffuse manner (as discussed further below). Accordingly, cover assembly 22 can be illuminated at a predetermined intensity by which the diffuse light from cover assembly 22 overpowers, and therefore reduces the appearance of, the specular reflection from electro-optic element 20. It is noted that the diffuse illumination of cover assembly 22 may, in some instances, itself become at least partially opaque or otherwise give an at least partially opaque appearance. Such a result may further the blocking or overpowering of specular reflection from electro-optic element 20. As mentioned above, the amount of specular reflection observable on the surface of electro-optic element 20 can increase as the light transmissivity of electro-optic element 20 is decreased. Accordingly, the intensity of illumination of cover assembly 22 can be increased in a manner that corresponds with the decreasing transmissivity of electro-optic element 20 to overpower the specular reflectance of electro-optic element 20 as it increases.

In an embodiment, the spectral reflectance exhibited by the electro-optic element 30 is in the form of a reflected image visible on the electro-optic element. Such a reflected image is visible by the electro-optic element 20 reflecting the ambient light in a spectral manner at an intensity that at least corresponds to the intensity of the ambient light itself. In one aspect, cover assembly 22 can, therefore, be illuminated to a level wherein the diffuse light emitted thereby is at an intensity level greater than the intensity level of the ambient light reflected by the electro-optic element 20. In another aspect, cover assembly 22 can be illuminated to a level of diffuse illumination thereof to maintain a perceivable level (such as by a human observer, for example) of specular reflectance of electro-optic element 20, as viewed through cover assembly 22, below 30% R, and in another embodiment between 15% R and 5% R, and in yet another embodiment, about 10% R or less. In another example, cover assembly 22 can be illuminated to a level of diffuse illumination thereof to reduce a perceivable level of specular reflectance of electro-optic element 20, as viewed through cover assembly 22, to below 30% of the level exhibited by electro-optic element 20 without such illumination, and in another embodiment between 15% and 5%, and in yet another embodiment, about 10% or less. Such reductions or specular reflectivity levels can be observable, for example, when electro-optic element 20 is in a darkened state (e.g. exhibiting a transmissivity of, in one embodiment, less than 10%, or in another embodiment, less than 5%). In an example, PCI 50 can be configured to control the illumination of cover assembly 30 at least partially based on a pre-programmed or otherwise predetermined correlation between an operating state of electro-optic element 20, including a level of darkening thereof, and an estimated resulting level of spectral reflectivity that becomes perceivable by an observer with such a level of darkening. In various examples, the amount of spectral reflectance visible on electro-optic element 20 and the reduction provided by viewing electro-optic element 20 through a diffusely-illuminated cover assembly 22 can be quantified based on comparing visible portions or features or overall image quality of an ambient image reflected by electro-optic element 20 with and without cover assembly 22 in an illuminated state, although other ways of quantifying such levels may be possible.

Additionally or alternatively, the intensity of the diffuse light from cover assembly 22 can be adjusted to exceed the level or intensity of light reflected in a specular manner from electro-optic element 20. For example, the intensity of illumination of cover assembly 22 can be controlled (for example, by PCI 50) to be greater than the amount of ambient light either estimated or perceived to be reflected by electro-optic element 20. The amount of ambient light reflected by electro-optic element 20 can be a product of the reflectance of electro-optic element 20 in combination with a given level of light transmissivity and the level of ambient light. The level of reflectance perceivable at various levels of light transmissivity can be determined and can be stored, for example, in memory within PCI 50 or within an application on a connected computer or mobile device, and accessed based on a current, known, setting for electro-optic element 20 (e.g., from data obtained from electronic control unit 48) in what may be characterized as a form of a feedback loop. The ambient light level can be generally estimated at a constant baseline level based on known conditions within a given environment, estimated at a real-time level based on information regarding the lighting condition of the workplace (such as from an automated lighting control system), or perceived, such as by photosensor 49.

In an example, PCI 50 can be configured to cause light sources 24 to illuminate light transmitting sheet 26 by a predetermined amount that blocks out or overpowers the specular reflectance of electro-optic element 20 present for a current state thereof. In an embodiment, PCI 50 can be pre-programmed to illuminate light sources 24 at a level that is determined to balance against a level of unwanted specular reflectivity exhibited by electro-optic element 20 at a current or selected level according to the various modes discussed above. Again, this can be done by using pre-programmed levels based on baseline estimates, using measured information, or a combination of measured and perceived information. In another embodiment, a user 61 can control the level of illumination for cover assembly 22 manually so as to adjust a perceived level of specular reflectivity from electro-optic element 20 through cover assembly 22, depending on personal preference. In either embodiment, the color of the light from cover assembly 22 can be adjusted, for example, to generally match the color of any adjacent walls of a workplace. Even further, the intensity of light from cover assembly 22 can be adjusted to match a reflective quality (i.e. overall diffuse and specular qualities) such walls when combined with the specular reflectivity of the electro-optic element 20. Such color or quality matching can be implemented when electro-optic element 20 is in a fully darkened state or progressively as it is darkened.

In another application, a color may be one selected by a particular workplace and ultimately activated by a user. For example, it is contemplated that the LEDs may be configured to emit a light that matches a desired color scheme inside the workplace. It is also possible to alter the intensity of the color and light exhibited by the edge lit cover assembly 22 by varying the power supplied to the LEDs (or light sources 24). This feature can be a controllable option provided to a user or controlled by a computer. This construction is desirable over alternative approaches, such as the use of liquid crystal displays (LCDs), which may have unacceptable levels of haze and which require an AC power source. The use of light sources such as LEDs draws little power such that there is an energy savings within the workplace, and in addition, by the use of LEDs, excessive amounts of heat can be limited.

In addition, or as an alternative, to matching a color scheme of a workplace interior, the color, brightness and/or intensity of the light sources 24 within cover assembly 22 can be controlled to produce a desired aesthetic effect. Such an effect can include the presentation of various lighting schemes, such as those designed to set a specific mood for the workplace (e.g., calm, alert, etc.), to correspond to certain activities or situations, or to mimic real world lighting (e.g., sunset, sunrise, etc.). Further, such lighting schemes, or even standard ambient lighting, as affected by the illumination of cover assembly 22, can also be made to correspond to the different darkness levels provided by the electro-optic element 20 associated therewith. This can be done according to the darkness levels of the electro-optic element 20 individually (such as through an automatic adjustment by, for example PCI 50, controller 48, or by a manual adjustment by a user). Such adjustment can further be done either according to groups of workstations or within the workplace as a whole (such as by PCI 50 or another computer within the workplace). Control of color and intensity can be pre-programmed based on predetermined or estimated lighting conditions, including through coordination with other workplace lighting, or can be done based on perceived conditions within the workplace, such as using one or more photosensors 49.

Lighting control using photosensors 49 or the like can be done using direct control in that the intensity of light sources 24 within cover assembly 22 (or a group of cover assemblies 22) can be set according to criteria involving information obtained from photosensors 49. In an example, the intensity of light sources 24 can be adjusted to match the ambient lighting perceived by photosensors 49. In a further embodiment, a feedback loop can be used such that information from photosensor 49 can be monitored as the intensity of light sources 24 are adjusted so that a change in ambient lighting conditions that result from the adjusting intensity of light sources 24 is taken into account. For example, the reduction in intensity of light sources 24 contributes to a reduction in overall ambient lighting, meaning that the use of a feedback loop can help bring the illumination of cover assemblies 22 into a condition that, over time, matches the overall ambient lighting. Various controls, including proportional integral-derivative ("PID") controllers can be used to implement a feedback loop of this type in a pleasing manner. In another example, photosensor 49 can be used in a feedback loop or the like to cause the light sources 24 within cover assembly 22 (or a group of cover assemblies 22) to compensate for a loss of ambient light due to darkening of one or more electro-optic elements 20.

Such lighting control can be implemented in a manner that combines the above-described automatic control with manual control functionality. For example, one or more of the above-described manual control modes can be used to adjust the workplace or work area lighting based on the illumination of light sources 24 within cover assembly 22 (or cover assemblies 22) according to a baseline level, from which an individual can cause deviation from on a particular cover assembly 22 through a manual override control. Still further, the above-described adjustment of the intensity of light sources 24 within cover assembly 22 for purposes of reducing the perceived spectral reflectivity from electro-optic element 20 can be combined with the other lighting schemes described herein. For example, the intensity of light sources 24 can be controlled to reduced perceived spectral reflectivity, whereas the color can be controlled according to a mood-lighting scheme. In another example, the intensity of light sources 24 can be set at a minimum level necessary to eliminate a desired level of spectral reflectivity, which can be increased to match a higher level of ambient lighting detected by photosensor 49. Further combinations for other purposes are also possible.

Figure 5:
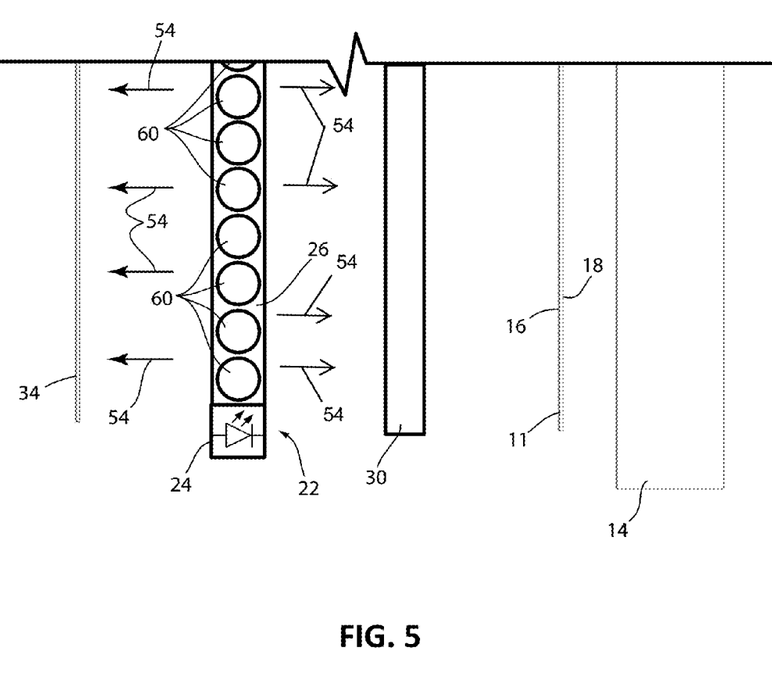
FIG. 5 is an alternative exploded view of the partition assembly of FIG. 1 showing additional details thereof.

With reference to FIG. 5, it is contemplated that one or more light transmitting sheets 26, which may be plastic sheets, may be utilized that include light diffusers, such as occlusions 60, therein. The occlusions 60 disperse the light directed into the edge of the light transmitting sheet 26, thereby creating a more uniform appearance. The occlusions 60 may also assist in directing light into the workplace in the direction of arrows 54 (as well as toward electro-optic element 20. The occlusions 60 may be in the form of spheres, cylinders, etc., that are incorporated into the light transmitting sheet 26 and which are dispersed consistently in a uniform or random fashion through the light transmitting sheet 26. When the LEDs are deactivated, the light transmitting sheet 26 has a transparent or mostly transparent appearance, but when the light sources 24, which may be LEDs, are activated and the light transmitting sheet 26 becomes edge lit, an opaque, or partially opaque, appearance is visibly perceived. It is contemplated that the light transmitting sheets 26 may be formed from acrylic or a polycarbonate material, as well as other similar materials. In addition, multiple layers of the light transmitting sheets 26 may be used, optionally with different color sheets. It is also contemplated that red, green, and blue light sources could be provided such that the color of the light transmitting sheet 26 can be modified to a multitude of various shades and colors.

In another embodiment, it is also contemplated that light transmitting sheet 26 is of a plastic material and is laminated to the cover assembly 22 or the electro-optic element 20. In one embodiment, the light transmitting sheet 26 is formed from an acrylic material provided by Evonik Cyro LLC (of Sanford, Me.), such as an 8NLD12, 0E011L, and 0E012XL Endlighten acrylics. However, other colored acrylic materials, as well as a variety of plastic materials, can also be utilized. Generally, the cover assembly 22 may be clear or colored and may be utilized with a light source that emits almost any wavelength of light. In an example, the cover assembly 22 may have a thickness of approximately 3.9 mm.

Figure 6:
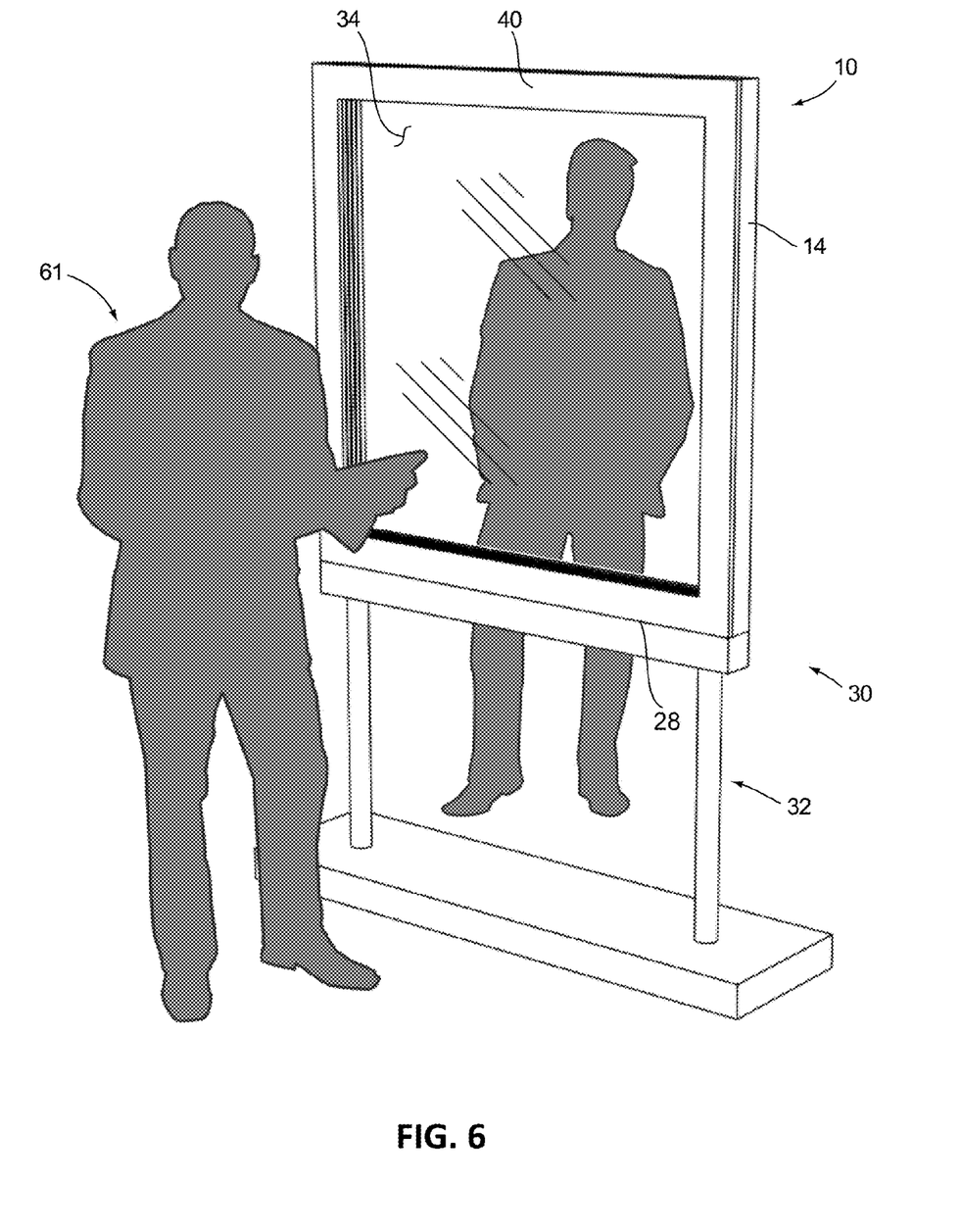
FIG. 6 is a front perspective view of the partition assembly of FIG. 1 incorporated into a divider assembly useable in a workplace.
Figure 7:
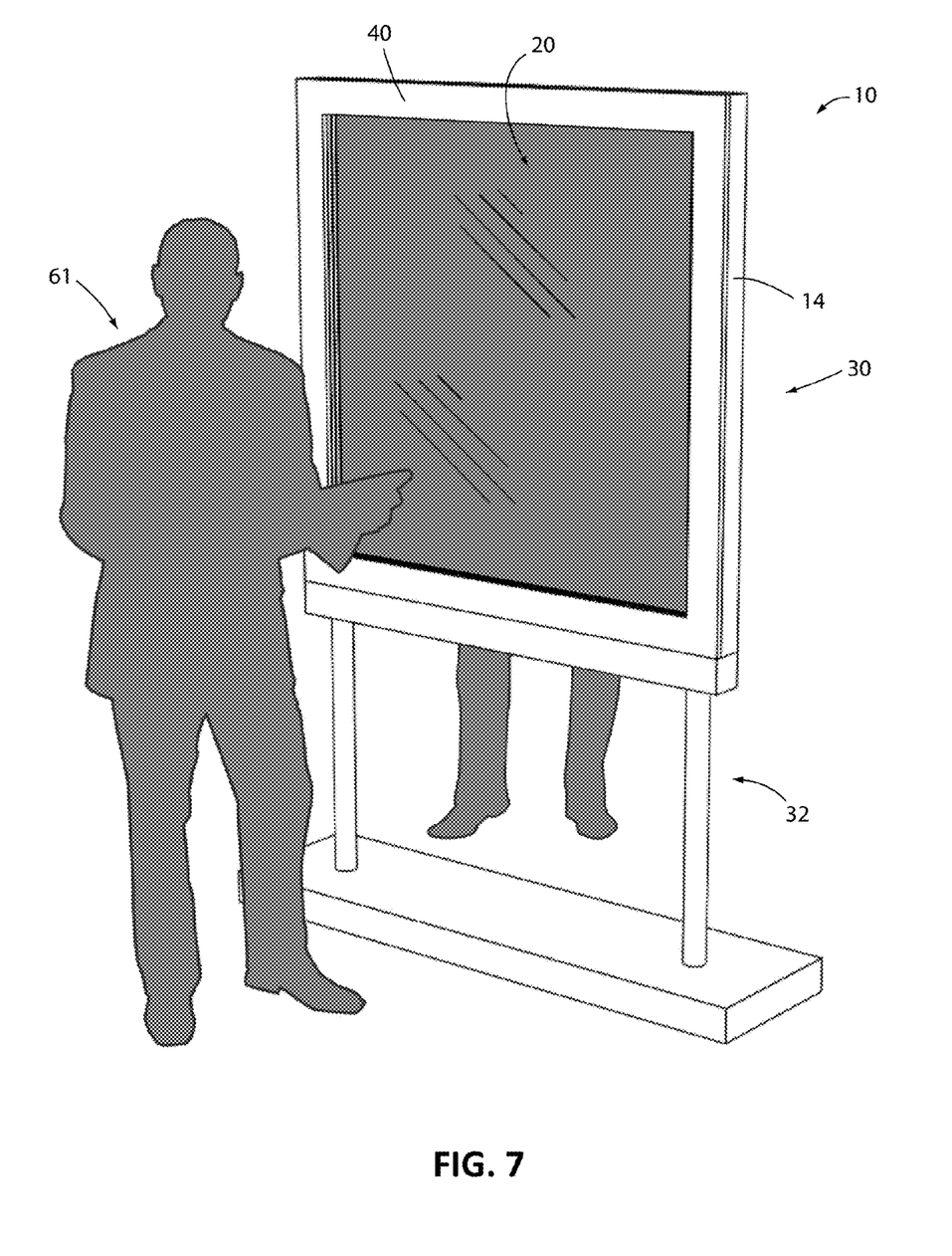
FIG. 7 is a front perspective view of the divider assembly of FIG. 6 with the partition assembly thereof in a darkened state.

As shown in FIGS. 6 and 7, partition assembly 10 can be assembled along an interface 28 thereof with a support structure of the like such that it can be used, for example, in divider assembly 30 to allow for selective transmission and blocking of visibility between adjacent work space areas. As shown, divider assembly 30 can be portable so as to allow for selective and reconfigurable adjustment of divisions between work place areas by mounting partition assembly 10 along interface 28 on a generally moveable support base 32. The incorporation of electro-optic element 20 in connection with first pane 11 can allow workers adjacent one or more areas associated with divider assembly 30 to increase or reduce the effect of such division by switching of electro-optic element 20 between the above-mentioned darkened state, transmissive state, or in some embodiments, one or more various intermediate conditions therebetween. This ability is illustrated in FIGS. 6 and 7, wherein, as shown in FIG. 6 electro-optic element 20 can be in a transmissive state, in which divider assembly 30 provides physical separation between adjacent areas and also may provide acoustic blocking between such areas, while allowing visibility from one such area to the other through partition assembly 10.

As shown in FIG. 7, when electro-optic element 20 is in a darkened condition, divider assembly 30 provides additional separation between adjacent areas by obstructing the view through partition assembly 10. As discussed above, while various benefits may be achieved by blocking the view between areas adjacent divider assembly 10, the general appearance of darkened electro-optic element 20 may be unpleasant to some who may dislike the darkened appearance or spectral reflective quality thereof. Accordingly, as shown in FIG. 6, and as discussed above, cover assembly 22 can be implemented to give divider assembly 30 to more pleasant appearance when in a non-transmissive state. This can include configuring light transmitting sheet 26 to diffusely emit light of one of various colors, which may, as described above, generally match adjacent portions of the interior of the related workspace.

Figure 8:
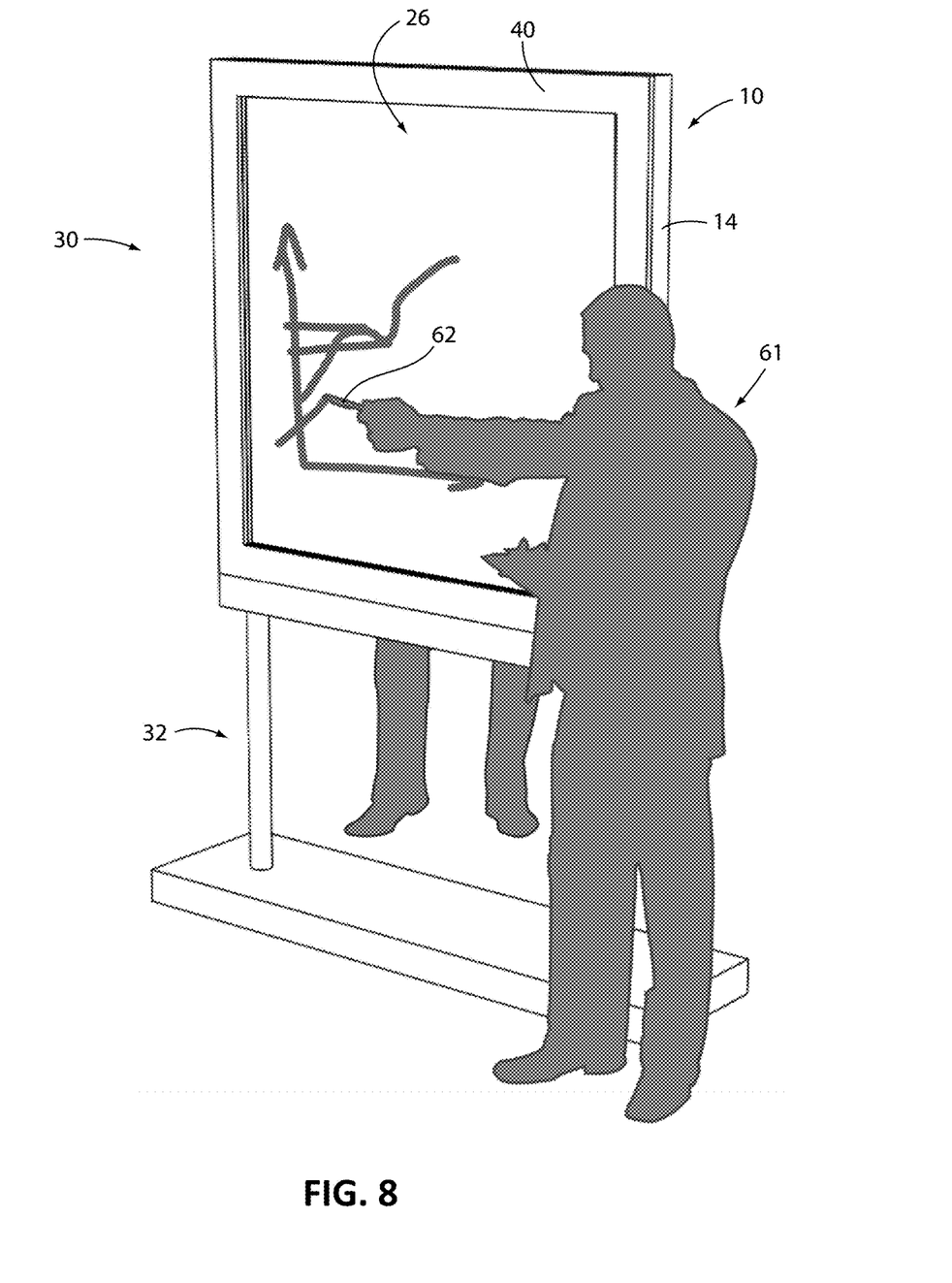
FIG. 8 is a front perspective view of the divider assembly of FIG. 6 with the partition assembly thereof in a whiteboard mode.

As further shown in FIG. 8, cover assembly 22 may be configured such that light transmitting sheet 26 diffusely emits a white or near-white color such that divider assembly 30 may be used as a white board or the like. Such a "white-board mode" may be implemented by a specific command implemented via UCI 46 or may be a default condition when electro-optic element 20 is switched to a darkened state. The white or near-white appearance of light transmitting sheet 26 may allow a user 61 to write, draw, or otherwise mark directly on either light transmitting sheet 26 or on second pane 34 that may overlie light transmitting sheet 26 with an appropriate marker 62. In an example, marker may be a dry-erase or another writing instrument dispensing an ink or other fluid specifically configured to dry on a generally flat non-porous surface in a manner such that can be substantially wiped away without the use of water, solvents, or other cleaning agents.

The incorporation of a second pane 34, in particular, in an embodiment where second pane 34 is of glass may make partition assembly 10 easier to clean and less susceptible to damage over time due to repeated writing and erasing thereon. In a further embodiment, a second cover assembly, similar to cover assembly 22 discussed above, can be incorporated into a variation of partition assembly 10 such that cover assemblies 22 are on either side of electro-optic element 20. Such a variation can include both first pane 11 and second pane 34 on opposite exterior surfaces of the resulting assembly, thereby facilitating use of either side of partition assembly 10 as a whiteboard in addition to providing a partition assembly 10 with the above-described anti-reflective and lighting characteristics on both sides thereof. In a still further embodiment, a partition assembly 10 used in connection with a cubicle or an interior or exterior wall can also be configured for use as a whiteboard in a manner similar to that which is described above with respect to FIG. 8.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A partition assembly comprising:
a rigid support frame;
a first transparent pane in abutting contact with an inner surface of the frame, the first transparent pane including an interior surface and an exterior surface;
an electro-optic element received within the frame and positioned adjacent the interior surface of the first transparent pane, the electro-optic element operating between a transmissive condition and a dimmed condition, a surface of the electro-optic element exhibiting a first level of spectral reflectivity at least when in the dimmed condition; and
a cover assembly received within the frame and positioned opposite the electro-optic element from the first transparent pane, the cover assembly including a light transmitting sheet and a plurality of light sources disposed at edges of the light transmitting sheet and to emit light into the light transmitting sheet to illuminate the light transmitting sheet with a diffuse light.

2. The partition assembly of claim 1, wherein:
the rigid support frame is rectangular; and
the first transparent pane, electro-optic element, and cover assembly are generally planar substrates with respective rectangular outer peripheries.

3. The partition assembly of claim 1, wherein a first edge of the rigid support frame defines an interface coupling the partition assembly with a support element.

4. The partition assembly of claim 3, wherein the support element includes at least a component of a portable divider, a window unit, or a cubicle wall.

5. The partition assembly of claim 1, further including a base supporting the frame in an upright position.

6. The partition assembly of claim 1, wherein:
the level of light transmission through the electro-optic element, when in the dimmed condition, is less than 10%.

7. The partition assembly of claim 1, wherein:
the plurality of light sources emit light into the light transmitting sheet to illuminate the light transmitting sheet with the diffuse light such that less than 30% of the first level of spectral reflectivity from the surface of the electro-optic element is perceptible through the light transmitting sheet.

8. The partition assembly of claim 1, wherein the light sources are further configured to transmit light into the light transmitting sheet to illuminate the light transmitting sheet with white light.

9. The partition assembly of claim 1, further comprising a second transparent pane of glass and received within the frame and positioned opposite the electro-optic element and the cover assembly from the first transparent pane.

10. The partition assembly of claim 9, wherein the second transparent pane contacts the light transmitting sheet, and the light transmitting sheet contacts the electro-optic element.

11. The partition assembly of claim 1, wherein the light sources are configured to transmit light into the light transmitting sheet to illuminate the light transmitting sheet according to one of: a predetermined color, a predetermined intensity, and a predetermined color and intensity.

12. The partition assembly of claim 11, further comprising a user-interface mounted to the frame and coupled with the light sources to allow a user to adjust at least one of the color and intensity thereof.

13. The partition assembly of claim 11, further comprising:
   a photosensor; and
   a controller coupled with the light sources of the cover assembly and with the photosensor, wherein the controller implements a feedback loop to control an illumination of the light transmitting sheet according to information received from the photosensor.

14. The partition assembly of claim 1, wherein the electro-optic element is an electrochromic element.

15. A partition assembly, comprising:
   an electro-optic element operating between a transmissive condition and a dimmed condition;
   a cover assembly proximate the electro-optic element and including a light transmitting sheet and a plurality of light sources disposed at edges of the light transmitting sheet to emit light into the light transmitting sheet to illuminate the light transmitting sheet according to one of: a predetermined color, a predetermined intensity, and a combined predetermined color and intensity;
   a control system coupled with the light sources of the cover assembly to control the illumination of the light transmitting sheet; and
   a rectangular frame supporting the electro-optic element and the cover assembly therein in a generally parallel and spaced apart manner.

16. The partition assembly of claim 15, wherein the rectangular frame is an assembly including an outer frame element and a plurality of spacers received within the frame, a first spacer positioned between the electro-optic element and the cover assembly.

17. The partition assembly of claim 16, further including a first transparent pane received within the frame opposite the cover assembly, wherein:
   the plurality of spacers includes a second spacer positioned between the electro-optic element and the first transparent pane.

18. The partition assembly of claim 16, further including a first transparent pane received within the frame opposite the electro-optic element, wherein:
   the plurality of spacers includes a second spacer positioned between the cover and the first transparent pane.

19. The partition assembly of claim 15, wherein a first edge of the rectangular frame defines an interface coupling the partition assembly with a support element that includes at least a component of one of a portable divider, a window unit, or a cubicle wall.

20. A partition assembly, comprising:
   an electro-optic element operating between a transmissive condition and a dimmed condition;
   a cover assembly proximate the electro-optic element and including a light transmitting sheet and a plurality of light sources disposed at edges of the light transmitting sheet to emit light into the light transmitting sheet to illuminate the light transmitting sheet;
   a rectangular frame supporting the electro-optic element and the cover assembly therein in a generally parallel and spaced apart manner, a first edge of the rectangular frame defining an interface; and
   a support element that includes at least a component of one of a portable divider, a window unit, or a cubicle wall coupled with the rectangular frame at the interface thereof.

* * * * *